2,896,683

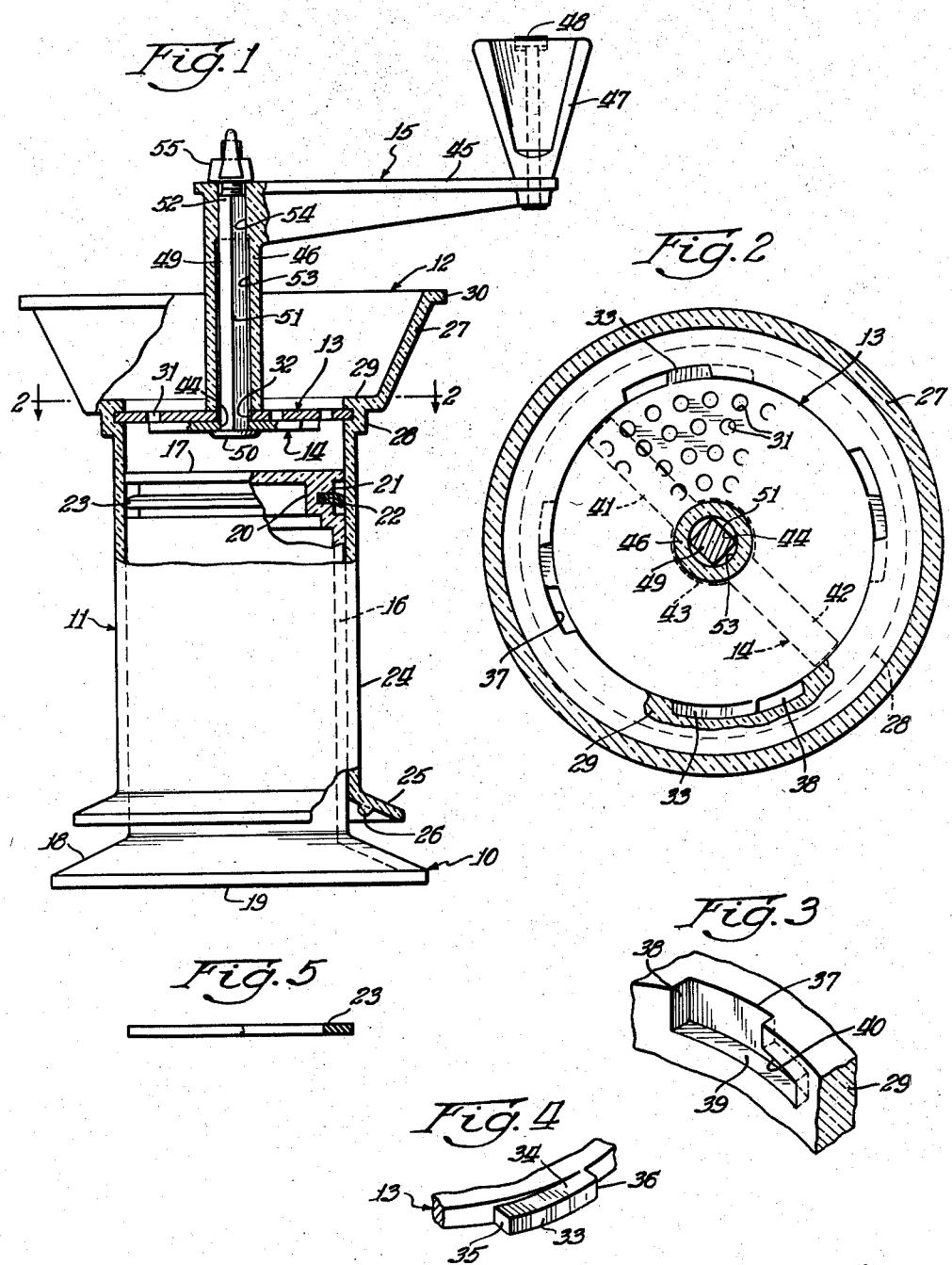

FOOD GRINDER

Charles R. Bowland, Spring Valley, Ill.

Application August 20, 1957, Serial No. 679,297

2 Claims. (Cl. 146—192)

My invention relates to food grinders.

It is an object of the invention to provide an improved food grinder of the type as is shown in my copending application, S.N. 549,265, filed November 28, 1955, now Patent No. 2,842,176, in which the food passes vertically and upwardly through the grinder as the food is ground and which is provided on its top with a receptacle portion or cup receiving the ground food processed by the grinder, and in which a perforated grinding plate may be easily removed from the grinder to allow the food to be put into the grinder from the top and from the receptacle portion.

It is a more particular object to provide the perforated grinding plate with tabs adapted to be received into recesses provided in the outer shell of the grinder, with certain mating surfaces of the tabs and recesses being slanted so that the tabs wedge into the recesses to firmly fix the plate with respect to the outer grinder shell. It is also an object to provide a handle and knife assembly in frictional contact with and rotatably disposed on the perforated plate by means of which the plate can be rotated slightly in the recesses to either fix it in or remove it from the outer grinder shell.

The invention consists of the novel constructions, arrangements and devices to be hereinafter described and claimed for carrying out the above stated objects and such other objects as will appear from the following description of a preferred form of the invention illustrated with reference to the accompanying drawing, in which:

Fig. 1 is a side elevational view, partially in section, of a food grinder embodying the principles of the invention and comprising a hollow outer shell holding a perforated plate and an inner piston having a sealing ring;

Fig. 2 is a sectional view on an enlarged scale taken on line 2—2 of Fig. 1;

Fig. 3 is a perspective view on an enlarged scale of an inner portion of the hollow outer shell;

Fig. 4 is a perspective view on an enlarged scale of a portion of the perforated plate; and Fig. 5 is a side view, partially in section, of the sealing ring.

Like characters of reference designate like parts in the several views.

Referring now to the drawing, the illustrated food grinder may be seen to comprise, in general, a base 10 in the form of a piston, a hollow shell 11 receiving the piston-like base 10, a food serving cup 12 on the top of the shell 11, a perforated plate 13 through which the food is pushed by the piston-like base 10, a knife 14 rotated in frictional contact with the lower face of the plate 13 and a handle 15 for driving the knife 14.

The base 10 comprises an elongated cylindrical piston portion 16 with a flat top face 17 and a bottom pedestal portion 18 flaring outwardly to increased diameter. The pedestal portion is provided with a flat annular bottom surface 19 so that the base 10 may set flat on a flat surface, such as a table top. The piston portion 16 is hollow and is provided with a thicker part 20 at its top with a smaller internal diameter. The portion 16 on its thicker part 20 is provided with a relatively shallow and wide circumferential groove 21 and a relatively deep and narrow circumferential groove 22 at the center of the groove 21. A sealing ring 23 of flat rubberlike material fits in the groove 22 and in its free condition as shown in Fig. 5 has an internal diameter slightly less than the root diameter of the groove 22, so that the ring 23 fits rather tightly in the groove 22.

The shell 11 comprises a cylindrical portion 24 having an internal diameter slightly larger than the external diameter of the piston portion 16, so that the piston portion 16 slides easily in the cylindrical portion 24. The outer diameter of the ring 23 is about the same as the inner diameter of the portion 24, so the ring may be expected to make a seal and grip with the inner surface of the portion 24.

The shell 11 is formed with an outwardly flared part 25 adapted to fit over the pedestal portion 18. A plurality of bosses 26 are formed on the bottom surface of the flared part 25 which are adapted to make contact with the pedestal portion 18 and limit the downward movement of the shell 11 on the piston portion 16.

The serving cup 12 is formed by an outwardly flaring portion 27 of the shell 11. A thickened part 28 connects the cylindrical portion 24 with the flaring portion 27 forming an upwardly facing shoulder 29. A radially extending rim 30 is preferably provided on the upper edge of the flaring portion 27.

The plate 13 is provided with a plurality of relatively small food extruding holes 31 therethrough and with a central relatively large diameter hole 32. The plate is formed with four tabs or ears 33 on its periphery, and each of these tabs is tapered toward an end thereof, having a downwardly slanted upper surface 34 so that one end 35 of each ear is thinner than the other end 36. The shell 11 in its thickened part 28 is provided with four recesses 37 therein for receiving the four ears 33. Each of the recesses has an entrance portion 38 sufficient in size to allow one of the ears 33 to pass downwardly therethrough, a lower flat surface 39, and an upper downwardly slanted surface 40 adapted to have face to face contact with the surface 34 of one of the ears 33.

The knife 14 is in face to face contact with the lower face of the plate 13 and comprises two blades 41 and 42 and a hub 43. The hub 43 is provided with a square opening 44 therethrough.

The handle 15 comprises an arm portion 45 and a sleeve shaft portion 46. A knob 47 is rotatably fixed on the end of the arm portion 45 by means of a rivet 48. A shaft 49 extends through the sleeve portion 46. The shaft 49 is formed with an enlarged head portion 50, a portion 51 that is square in cross section and a threaded portion 52. The sleeve portion 46 has a round opening 53 and a square opening 54 therethrough. The square shaft portion 51 fits non-rotatively in the opening 44 in the knife 14 and in the square opening 54 of the handle 15, and the square shaft portion fits loosely in the round opening 53. The threaded portion 52 of the shaft 49 extends through the square portion 54 and protrudes from the top of the handle 45, and a wing nut 55 holds the shaft 49, the plate 13 and the handle 15 in assembled relation.

The base 10, the shell including the cup 12, the handle 15 and the knob may all if desired be formed of a suitable plastic. The knife 14 may be formed of uniform thickness stock and is of a suitable hard material, such as hardened steel, so that it provides sharp cutting edges in contact with the plate 13. The plate 13 may also be formed of hardened steel.

The grinder may be disassembled for cleaning purposes by pulling the base 10 out of the shell 11; and the assembly of the handle 15, the shaft 49, the knife 14 and the plate 13 may be removed from the shell 11 before or afterwards. In order to remove the latter assembly from the shell, the wing nut 55 is tightened so that the bottom of the sleeve shaft portion 46 bears tightly on the top face of the plate 13. The handle 15 is then turned counterclockwise as seen in Fig. 2, with the shell 11 being held stationary, and the turning moment is transmitted to the plate 13. The tabs 33 are thereby moved in the recesses 37 with the lower flat faces of the tabs 33 sliding along the lower flat recess surfaces 39 with the upper slanted surfaces 34 separating from the slanted recess surfaces 40 until the tabs 33 are in the entrance portions 38 of the recesses 37. The handle-plate-knife assembly is then drawn upwardly with the tabs 33 passing through the recess entrance portions 38 to separate the assembly of the plate 13, the knife 14 and the handle 15 from the shell 11.

This handle-plate-knife assembly is taken apart by removing the wing nut 55 from the shaft 49, and the shaft 49 may then be with-drawn from the handle sleeve portion 46. The knife 14 and plate 13 passes freely off the top of the shaft 49.

The grinder may be reassembled by first reassembling the knife 14 and plate 13 on the shaft 49 and passing the shaft 49 through the sleeve portion 46, with the square shaft portion 51 passing through and being in non-rotative relation with the square opening 54 in the handle 15 and then putting the wing nut 55 on the shaft 49. Tightening the wing nut 55 renders the knife 14 and the plate 13 relatively immovable with respect to the handle 15, and the plate 13 is returned to its position in the shell 11 by passing the tabs 33 through the entrance portions 38 of the recesses 37 and turning the handle 15 clockwise so as to move the tabs 33 into locking relation in the recesses 37. This rotation of the plate 13 causes the lower flat surfaces of the tabs 33 to move accordingly on the lower surfaces 39 of the recesses 37 and causes the slanted upper surfaces 34 of the tabs 33 to mate and bind with the slanted surfaces 40 of the recesses 37 so as to secure the plate 13 in the upper part of the shell 11 as shown in Figs. 1 and 2.

The wing nut 55 may then be loosened slightly so that the knife 14 may rotate on the bottom surface of the plate 13, the knife being driven by means of the square shaft 49 which is in non-rotative relation with both the knife 14 and the handle 15 and particularly with the square openings 44 and 54 in the knife and handle respectively. There is some friction between the knife 14 and the plate 13, and the handle is rotated in the clockwise direction in actual grinding so that the moment imparted to the plate 13 forces and holds the tabs 33 in wedging engagement in the recesses 37. The base 10 is put into the shell 11 either before or after the plate 13 is reassembled into the shell 11. When the base is within the shell 11 to the limit of its movement, the bosses 26 contact the pedestal portion 18 of the base 10, and the upper piston surface 17 is thereby held out of contact with the knife 14.

In order to use the grinder, the food to be ground may be put into the shell 11 by removing the piston 10 from the shell 11 and inserting the food into the lower open end of the shell, the shell being inverted at the time. Preferably however, the food is put into the shell through the upper end of it, after the plate 13 along with the knife 14 and handle 15 have been removed as an assembly as described before. The shell 11 is moved upwardly on the piston 10 at the time so as to allow a substantial space in the shell above the upper surface 17 of the piston 10 for the food. The assembly of the handle 15, the knife 14 and the plate 13 is then returned to the shell 11 as described before, with the tabs 33 being inserted in the recesses 37 and locked therein by turning the plate 13; the wing nut then is loosened so as to allow ready turning of the handle and knife 14.

The grinder is then positioned on a table or other flat surface with the pedestal portion 18 resting thereon, and the shell 11 is gripped by the operator using one hand therefor and is pushed downwardly so as to compress the food within the shell on the upper face 17 of the piston 10. The handle 15 is turned in the clockwise direction at the same time, so as to rotate the knife 14 on the bottom surface of the plate 13, and the food is forced through the perforations 31 of the plate 13 by the pressure on the food due to the downward force put on the shell 11 and is at the same time cut by the rotating knife 14. The food as so ground is collected in the serving cup 12 on the top of the shell 11, and the food may be served directly from the serving cup 12. During the grinding operation the lower surface of the sleeve portion 46 of the handle 15 rotates on the upper surface of the plate 13 and functions as a bearing in the handle-knife-plate assembly.

The rubber seal ring 23 during the grinding operation seals the piston 10 with respect to the shell 11 and prevents juices from the food being ground from escaping out of the bottom of the shell 11. The outer edge of the ring 23 flexes and follows along with the inner surface of the shell 11 within the wide groove 21 in its sealing action.

With my improved grinder, the food advantageously may be inserted into the top of the shell 11 after first removing the assembly of the handle 15, the shaft 49, the knife 14 and the plate 13. The plate 13 is advantageously provided with the ears 33 that mate with the corresponding recesses 37 in the shell allowing ready withdrawal of the plate 13 from the shell 11 and quick locking of the plate in the shell.

I wish it to be understood that my invention is not to be limited to the specific constructions shown and described, except only so far as the claims may be so limited, as it will be understood to those skilled in the art that changes may be made without departing from the principles of the invention.

I claim:

1. In a food grinder, the combination of a tubular shell adapted to contain food, a perforated plate positioned across an end of the shell and through which the food is forced, a piston slidable within the shell for acting on the food and forcing it through the perforated plate, a rotatable knife in contact with the inner surface of the perforated plate for cutting the food as it passes through the plate, a shaft fixed with respect to said knife and passing through the plate, a knife rotating handle having a sleeve portion disposed about the shaft and resting on the outer surface of the plate, a nut for tightening the handle and knife with respect to said plate, said plate being formed with a plurality of tabs on its periphery and said shell being provided with a like number of tab receiving recesses, each of said tabs and corresponding recess being provided with mating surfaces one of which is slanted so that the plate may be rotated by means of said handle when said nut is tightened in order to tighten the plate with respect to the shell due to the wedging action of the slanted surfaces.

2. In a food grinder, the combination of a tubular shell adapted to contain food, a perforated plate extending across an end of the shell and through which the food is forced, a piston slidable within the shell for acting on the food and forcing it through the plate, said piston being adapted to be positioned on a supporting surface so that downward force may be manually put on the shell in a vertical position to cause the piston to force the food through the perforated plate, an outwardly flared part fixed on the upper end of said tubular shell forming a receptacle for receiving the food as it is ground and from which the ground food may be served, a rotatable knife in contact with the inner surface of the perforated plate for cutting the food as it passes through the plate, and a handle connected to said knife to rotate it and positioned above said outwardly flared part and resting on the outer surface of said plate to hold the knife in tight contact with said plate, said plate being formed with a plurality of tabs on its periphery and said shell being provided with a like number of tab receiving recesses, each of said tabs and corresponding recess being provided with mating slanted surfaces so that said plate may be rotated by means of said handle in order to tighten the plate with respect to the shell due to the wedging action of the slanted surfaces and said tabs and recesses allowing the removal of said plate and handle from the shell so that the shell may have food inserted therein onto the top of said piston.

References Cited in the file of this patent

UNITED STATES PATENTS

| | | |
|---|---|---|
| 419,103 | Baltzley | Jan. 7, 1890 |
| 965,384 | Gebauer | July 26, 1910 |
| 1,239,704 | Lee et al. | Sept. 11, 1917 |
| 1,611,244 | Schmidt | Dec. 21, 1926 |
| 1,614,754 | Murphy | Jan. 18, 1927 |
| 2,439,028 | Taylor | Apr. 6, 1948 |
| 2,456,066 | Kempton | Dec. 14, 1948 |
| 2,572,960 | Steans | Oct. 30, 1951 |

FOREIGN PATENTS

| | | |
|---|---|---|
| 114,630 | Germany | Nov. 9, 1900 |
| 130,079 | Germany | Apr. 22, 1902 |